United States Patent

[11] 3,584,618

| [72] | Inventors | Clyde J. Reinhard<br>La Habra Heights;<br>Gordon R. Justus, Anaheim; Kenneth L.<br>Kearns, Orange, all of, Calif. |
|---|---|---|
| [21] | Appl. No. | 807,861 |
| [22] | Filed | Mar. 17, 1969 |
| [45] | Patented | June 5, 1971 |
| [73] | Assignee | Beckman Instruments Inc. |

[54] A SYSTEM AND METHOD FOR MONITORING A PROGRESSIVE SEQUENCE OF PHYSIOLOGICAL CONDITIONS
33 Claims, 3 Drawing Figs.

[52] U.S. Cl. ......................................... 128/2.1R
[51] Int. Cl. ........................................ A61b 5/05
[50] Field of Search ........................... 128/2.08,
201, 145.5 – .8, Dig. 17, 2.05, 2.06; 340/309.1,
309.3, 309.4

[56] References Cited
UNITED STATES PATENTS
3,316,902 5/1967 Winchel et al. ............... 128/145.5
3,414,896 12/1968 Glick et al. .................... 128/145.5

*Primary Examiner*—William E. Kamm
*Attorneys*—Thomas L. Peterson, Richard M. Jennings and Robert J. Steinmeyer ABSTRACT: An alarm circuit for a respiration monitoring system which, in response to electrical signals indicative of the occurrence of a breath, determines whether the time interval between successive breaths exceeds a first preset time interval. When this occurs, a warning indicator is activated and the circuit begins monitoring the respiration rate. If the rate during a second preset time interval is less than a first preset rate, a low rate indicator is activated and the circuit determines whether the respiration rate during the second time interval and a third preset time interval is less than a second preset rate which is greater than the first preset rate. If the rate exceeds the second preset rate, the warning and low rate indicators are deactivated. If the rate is less than the second preset rate, an apnea indicator is activated.

PATENTED JUN 15 1971

INVENTORS
GORDON R. JUSTUS,
KENNETH L. KEARNS
BY CLYDE J. REINHARD

Thomas L. Peterson

ATTORNEY

A SYSTEM AND METHOD FOR MONITORING A PROGRESSIVE SEQUENCE OF PHYSIOLOGICAL CONDITIONS

BACKGROUND OF THE INVENTION

1. Field of the Invention

The present invention relates to a physiological monitoring system and, more particularly, to an alarm circuit for a respiration monitoring system for generating audible and visual alarm signals in the presence of abnormal breathing by a subject especially an infant.

2. Description of the Prior Art

Many systems presently exist for producing electrical signals which vary as a function of changing physiological activities such as breathing, blood pressure, temperature, heart rate, etc. These electrical signals are either recorded for later analysis or are used instantaneously to monitor the specific physiological activity so as to generate audible and/or visual monitoring signals.

In the monitoring of respiration, various instruments have been employed such as the body plethysmograph, the spirometer, the thermistor-nostril sensor, the chest-band strain gauge, and the impedance pneumograph. Each of these instruments produces electrical signals indicative of the patient's breathing pattern so that volume and rate information may be derived.

While these instruments are, in large measure, effective in the monitoring of respiration, there are two primary complicating factors which mitigate against the utility of these instruments. In the first instance, the electrical signal resulting from the attempted monitoring is usually the product of numerous physiological activities in progress in the body in addition to the specific activity of interest, as well as a composite of extraneous signals and motion artifacts from various sources and causes within and without the monitoring apparatus. One system which relates to this problem is disclosed in copending U.S. Pat. application Ser. No. 656,805 filed July 28, 1967, now abandoned, for Physiological Monitoring System by Allan F. Pacela and Fredrick J. Savaglio, and assigned to Beckman Instruments, Inc. the Assignee of the present application. The monitoring apparatus disclosed therein utilizes a constant current impedance pneumograph as the monitoring means and a narrow band-pass filter and detector which operate as a digital breath identification circuit, discriminating against signals from body movement, pulmonary blood flow and other causes in favor of the signal resulting from respiration, and digitally identifying respiration on a breath-by-breath basis in a manner which includes both volume and rate information. The resultant output is a pulse for each recognized breath.

The second problem is in providing a suitable alarm circuit which will, on the basis of the generated pulses, control both audible and visual alarms and reliably indicate the status of the patient's breathing pattern. This latter objective is complicated by the wide variety of breathing patterns which may be considered to be abnormal. For example, in the case of a premature infant where apnea neonatorum or respiratory failure is a common cause of death, there are unpredictable and widely varying patterns of respiration and body movement. It is not unusual for the infant to stop breathing for a relatively short period of time and then to revert to a normal breathing pattern. In this case, it would be undesirable for the alarm circuit to trigger the alarm. It is also not unusual for the breath rate to decrease to a level which, when considered by itself, would not appear to represent a serious problem, but which if continued for a long period of time, may result in an inadequate amount of oxygen reaching the infant's body. In this case it would be unacceptable if the alarm circuit were not triggered.

It is therefore apparent that any alarm circuit operating on respiration data from an infant must be operative to reliably generate audible and visual respiratory alarm signals to the attending physicians and nurses. In the fact of artifact information, mixed with respiration information, the alarm system should minimize the occurrence of both false positive alarms, i.e. alarm signals generated when no alarm condition exists, and false negative alarms, i.e. no alarm signal generated when an alarm condition does exist.

SUMMARY OF THE INVENTION

In accordance with the present invention, there is provided a physiological monitoring system for monitoring the rate of breathing of a patient including an alarm circuit which, in response to pulses indicative of a recognized breath, controls both audible and visual alarms to indicate the extent of an abnormal breathing pattern. Three alarm levels are generated, which progress in intensity as the elapsed time increases from the point when the patient's normal breathing pattern ceased. The first alarm level is a visual warning only and indicates the occurrence of a ten second pause in the patient's breathing. Simultaneously, the circuit begins monitoring the patient's respiration rate more closely. The second alarm level indicates a low breathing rate visually and with a pulsating audible alarm tone. The low rate signal indicates that there has not been four valid breaths in 10 seconds since the end of the 10 second pause in the patient's breathing. The third alarm level indicates apnea visually and with a solid audible alarm tone. This level indicates that there has not been 10 valid breaths in 20 seconds since the end of the 10 second pause in the patient's breathing.

The present alarm circuit provides a self-extinguishing feature which results in the alarm signals being automatically deactivated if the patient's respiration pattern returns to normal rates. However, the criteria for returning to the no-alarm condition becomes progressively more stringent as the elapsed time from the last breath increases. Furthermore, this escape criteria is sufficiently tight to exclude most motion artifacts from causing a false negative alarm. Once the criteria has been met for initiating the apnea alarm stage, the alarm cannot be extinguished except manually, thereby forcing a visit to the patient's bedside by the attending nurse or physician.

It is, therefore, an object of the present invention to provide a method and apparatus for the reliable generation of audible and visual respiratory alarm signals based on respiration data form a patient.

It is a further object of the present invention to provide a respiration monitoring circuit which minimizes the occurrence of alarm signals when no alarm condition exists.

It is a still further object of the present invention to provide a respiration monitoring circuit which minimizes the occurrence of no alarm signals being generated when an alarm condition exists.

It is another object of the present invention to provide a respiration monitoring circuit having a plurality of levels of alarm indication which progress in intensity as elapsed time increases from the cessation of the patient's normal breathing pattern.

It is still another object of the present invention to provide a respiration monitoring circuit having a plurality of levels of alarm in which the escape criteria for returning to the no-alarm condition becomes progressively more stringent as the elapsed time from the last normal breath increases.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a schematic block diagram illustrating the present respiration monitoring system;

FIG. 2 is a schematic block diagram of the alarm control circuits of the system of FIG. 1.

DESCRIPTION OF THE PREFERRED EMBODIMENT

Figure 3:
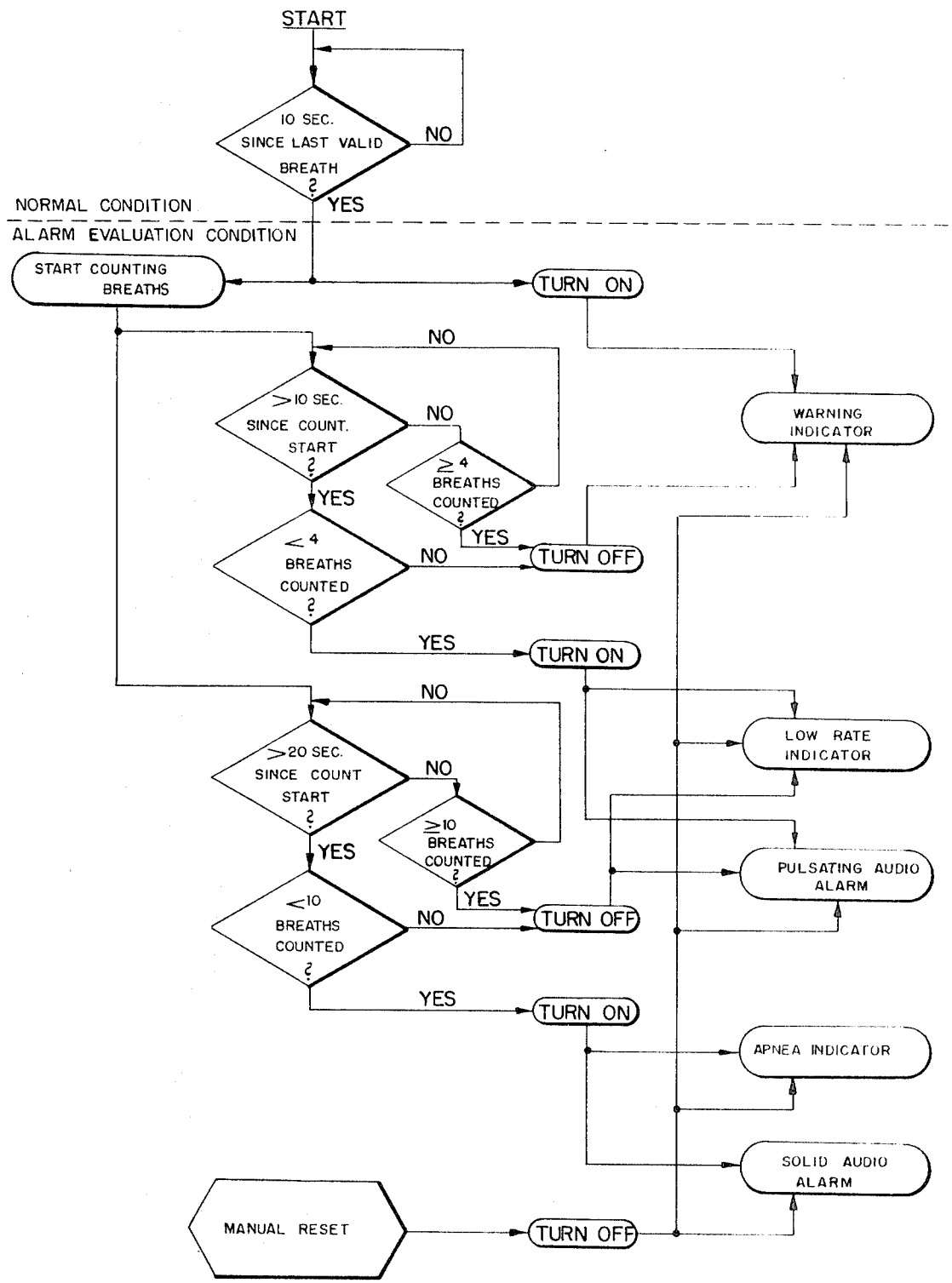
FIG. 3 is a logical flow diagram indicating the sequence of operations of the alarm circuit of FIG. 2.

Referring now to the drawings and, more particularly, to FIG. 1 thereof, the present respiration monitoring system includes a constant current impedance pneumograph 10 serving as a transducer for monitoring impedance changes across the thorax of a patient 11 and for producing a correspondingly varying electrical signal. In impedance pneumograph 10, a constant AC carrier current, with zero DC component, is applied across the thorax of patient 11, such as a premature infant, by means of a pair of biological skin electrodes 12 and 13 which are attached directly to the skin in accordance with conventional practice. As patient 11 breathes, the transthoracic impedance between electrodes 12 and 13 changes resulting in an amplitude modulation of the AC carrier signal as a function of inspiration and expiration. For an example of a constant current impedance pneumograph and a more detailed discussion of the operation thereof, reference should be had to the beforementioned U.S. Pat. application Ser. No. 656,805.

The electrical signal generated by impedance pneumograph 10, which varies in accordance with the real and apparent transthoracic impedance changes in patient 11, is applied over a line 14 to a breath identification circuit 15. The function of breath identification circuit 15 is to identify the respiration components of the modulation signal from pneumograph 10 and to generate a pulse for each recognized breath. A suitable breath identification circuit is disclosed in the beforementioned U.S. Pat. application Ser. No. 656,805 wherein FIG. 7 graphically illustrates the constant amplitude pulses generated for each recognized inspiration. As disclosed therein, these breath pulses may be utilized to drive a tachometer 16 and a rate display meter 17 to provide breathing rate information integrated over a substantial period of time.

Since constant physical attendance at the patient is not always desirable or possible, and since meter 17 only indicates average breathing rate, the output of breath identification circuit 15 is also applied over a line 18 to an alarm control circuit 19. As will be described more fully hereinafter, alarm control circuit 19 operates to control both visual alarms 20 and audio alarms 21 to warn of an abnormality in the patient's breathing pattern.

Referring now to FIG. 2, the breath pulses from breath identification circuit 15 are applied over line 18 to the reset terminal R of a 10 second warning timer 30. Warning timer 30 is a conventional timer which, if not reset by a pulse, measures out its set time interval and provides a suitable signal over a line 31 which indicates that the elapsed time between breaths has exceeded the preset interval. The signal on lead 31 is applied to the set input terminal S of a warning latch circuit 32. When the warning latch is set a reset signal appears on line 31a and is applied to reset input terminals R of a 10 second accumulator 33 and a 20 second accumulator 34. Accumulators 33 and 34 also have count input terminals C which receive the breath pulses over line 18. Warning latch circuit 32 may be, most simply, a bistable circuit which, when placed in its set condition, applies a signal over a line 35 to the enable input terminal E of a warning visual display 36, a signal over line 31a to reset accumulators 33 and 34, and a signal over a line 37 to the enable input terminal E of a low rate timer 38. When warning latch 32 is reset, as will be explained more fully hereinafter, it disables warning visual display 36 and low rate timer 38 but does not reset accumulators 33 and 34.

Ten second accumulator 33, when reset, is operative to count the number of breath pulses which occur during the next 10 second interval. If at least four breaths are counted during this period, accumulator 33 generates a pulse which is applied over a line 39 to the reset input terminal R of warning latch circuit 32 which, in turn, disables warning visual display 36 and low rate timer 38. If fewer than four breaths are counted during this ten second time period, latch circuit 32 is not reset.

Low rate timer 38 is a conventional timer, similar to warning timer 30, which, if not reset by a pulse over line 37, measures out its set time interval. Therefore, if a 10 second period elapses without warning latch 32 being reset by 10 second accumulator 33, low rate timer 38 generates a low rate signal which is applied over a line 40 to the set input terminal S of a low rate latch circuit 41. Low rate latch circuit 41 is similar to warning latch circuit 32 and may be, most simply, a bistable circuit which, when set, applies a signal over a line 42 to enable input terminals E of a low rate visual display 43 and a pulsing audio tone generator 44. When set, low rate latch 41 also provides a signal over a line 45 to the enable input terminal E of an apnea timer 46. When low rate latch circuit 41 is reset, as will be explained more fully hereinafter, it disables low rate visual display 43, pulsing audio tone generator 44 and apnea timer 46.

Accumulator 34 is similar to accumulator 33 and, when reset by the setting of the warning latch 32, is operative to count the number of breath pulses which occur during the following 20 second interval. If at least 10 breath pulses are counted during this period, accumulator 34 generates a pulse which is applied over a line 47 to the reset input terminal R of low rate latch circuit 41 which, in turn, disables low rate visual display 43, pulsing audio tone generator 44, and apnea timer 46. It should also be apparent that if 20 second accumulator 34 counts 10 pulses during this 20 seconds time interval, 10 second accumulator 33 will also count four pulses during one of the two 10 second intervals and will, therefore, reset warning latch 32 which, in turn, disables warning visual display 36.

Apnea timer 46 is conventional timer, similar to warning timer 30 and low rate timer 38, and is operative to generate a signal over a line 48 if no disabled within a 10 second time period after being enabled by a signal over line 45 from low rate latch 41. Therefore, and in the event that fewer than 10 breath pulses are counted during the 20 second period starting from the reset pulse from warning timer 30, apena timer 45 generates a signal which is applied over line 48 to the set terminal S of an apnea latch circuit 49. Apnea latch circuit 49 is similar to low rate latch circuit 41 and warning latch circuit 32 and may be, most simply, a bistable circuit which upon being set, provides a signal over a line 50 to the enable input terminals E of an apnea visual display 51 and a solid audio tone generator 52. Once the apnea alarm has been triggered, apnea visual display 51 and solid audio tone generator 52 cannot be extinguished automatically thereby forcing a visit to the patient's bedside by the attending nurse or physician. Once there, the nurse or physician may manually depress an alarm reset switch 53 which applies a pulse over a line 54 to the reset input terminals R of warning latch 32, low rate latch 41 and apnea latch 49, which circuits, in turn, disable visual displays 36, 43 and 51 and audio tone generators 44 and 52.

In operation, and referring now to FIGS. 2 and 3, the present monitoring system and alarm circuit is intended primarily for monitoring the breathing of premature infants. For this reason, the respiration identification features and the alarm strategy have limits and ranges characteristic of premature infant respiration. However, the instrument will satisfactorily monitor adult respiration by suitably alternating the time periods of the several timers and the counting capacity of the several accumulators. The present alarm system is initialized by each detected breath pulse appearing on line 18. After each breath pulse, warning timer 30 starts a 20 second time period running. If the next breath does not occur within that 10 second interval, warning latch 32 is set, accumulators 33 and 34 are reset and warning visual display 36 and low rate timer 38 are enabled,. The number of breaths is then counted during the next 10 second time period. If a number of breaths equal to or greater than four corresponding to a rate equal to or greater than 24 breaths per minute for this 10 second period is detected by 10 second accumulator 33, warning latch 32 is reset, warning visual display 36 and low rate timer 38 are disabled, and the instrument continues to monitor. However, if a number of breaths less than four is counted corresponding to a rate of less than 24 breaths per minute for this 10 second period, 10 second accumulator 33 does not reset warning latch 323 and low rate timer 38 sets low rate latch 41 which, in turn, enables pulsing audio tone generator 44 and low rate visual display 43. Simultaneously, 20 second accumulator 44 counts the number of breaths during the 20 second period since the alarm condition was initiated. If the number of breaths equals or exceeds 10 corresponding to an average respiration rate equaling or exceeding 30 breaths per minute for this 20 second period, 20 second accumulator 34 resets low rate latch 41 which, in turn, disables pulsing audio tone generator 44 and low rate visual display 43, and 10 second accumulator 33 resets warning latch 32 which, in turn, disables warning visual display 36. In addition, the resetting of low rate latch 41 disable apnea timer 46. On the other hand, if the number of breaths counted is less than 10 corresponding to an average respiration rate less than 30 breaths per minute during this 20 second time interval, apnea timer 46 sets apnea latch 49 which, in turn, enable apnea visual display 51 an solid audio tone generator 52. When this condition is reached, manual alarm reset switch 53 may be actuated to turn off apnea visual display 51 and solid audio tone 52, to turn off low rate visual display 43 and pulsing audio tone 44, and to turn off warning visual display 36.

It can, therefore, be seen that in accordance with the present invention there is provided a reliable circuit for the generation of audible and visual respiratory alarm signals to attending physicians and nurses based on respiration data from a patient. The alarm cycle is begun after only a 10 second pause in the patient's respiration pattern. This 10 second pause is not sufficient cause for an all-out alarm signal. It is, however, cause to begin monitoring closely the infant's respiration rate. A longer delay period raises considerably the probability that the motion artifact caused by the patient's struggle to breathe will be interpreted as a valid breath. The circuit also provides a self-extinguishing feature which turns off the alarm signals if the patient's respiration pattern returns to normal rates. Therefore, if a 10 second pause in the respiration pattern is followed by normal respiration rates, the alarm circuit is deactivated, thereby preventing a false positive alarm.

The criteria for returning to the no-alarm condition becomes progressively more stringent as the elapsed time from the last breath increases. In other words, whereas breathing four breaths corresponding to a rate of 24 breaths per minute during the first 10 seconds after the initial 10 second pause in the infant's respiration pattern will cause a return to the no-alarm condition, 10 breaths corresponding to a rate of 30 breaths per minute is required in the first 20 second interval after the initial 10 second pause in order to return to the no-alarm condition. This has the effect of minimizing the occurrence of false negative alarms, i.e. no alarm signal generated when an alarm condition does exist. Finally, once the criteria has been met for initiating the last alarm stage, indicative of apnea, the alarm cannot be extinguished except by manual depression of alarm reset switch 53. This feature forces a visit to the infant's bedside by the attending nurse or physician Three levels of alarm indication are generated which progress in intensity as elapsed time increase from the cessation of the patient's normal breathing pattern. The first alarm level is called "warning" and is visual only. The second level is called "low-rate" and is accompanied by a pulsating audible alarm tone. The third level is called "apnea" and is accompanied by a solid audible alarm tone. Table I interprets the significance of various combinations of these three alarm levels starting from the point in item when the alarm combination is in the off state proceeding to the time when the particular alarm combination is indicated.

TABLE I

| | Alarm combination | | | Number of breaths in indicated time periods measured from start to produce alarm combination | | | |
|---|---|---|---|---|---|---|---|
| | Warning | Low-rate | Apnea | 10 sec. | 20 sec. | 30 sec. | >30 sec. |
| (1) | Off | Off | Off | Less than 10 seconds between breaths | | | |
| (2) | On | Off | Off | 0 | | | |
| (3) | On | On | Off | 0 | <4 | | |
| (4) | On | On | On | 0 | <4 | <4 | |
| (5) | Off | On | On | 0 | <4 | <4 | ≥4 |
| | | | | 0 | <4 | (≥4, <10) | |
| (6) | Off | Off | On | 0 | <4 | <4 | 1≥10 |
| | | | | 0 | <4 | (≥4, <10) | 1≥10 |

[1] <10 second spacing for breaths >4.
Last number in a row indicates time period when alarm combination occurred.

Combination (2) is the first alarm level and indicates that there has been a 10 second interval without a valid breath. Combination (3) is the second alarm level and indicates that there has been a 10 second interval without a valid breath and less than four breaths in a 20 second period. Combination (4) is the third alarm level and indicates that there has been a 10 second interval without a valid breath and breathing has been at a rate less than eight breaths per minute in a 30 second period. Combination (5) occurs when 10 second accumulator 33 resets warning latch 32 but there is an insufficient breathing rate for 20 second accumulator 34 to reset low rate latch 41. Accordingly, one interpretation of combination (5) is that a 10 second period without a valid breath may have been followed by a breathing rate ≥12 breaths per minute but <30 breaths per minute in the next 20 second period if the alarm combination is initiated at the end of this 20 second period. Finally, combination (6) indicates that a 10 second period without a valid breath may have been followed by a 20 second period with a breathing rate of less than 30 breaths per minute which in turn has been followed by enough breaths to total or exceed 10, those breaths occurring after a total of four being less than 10 seconds apart.

While the invention has been described with respect to a preferred physical embodiment constructed in accordance therewith, it will be apparent to those skilled in the art that various modifications and improvements may be made without departing from the scope and spirit of the invention. For example, although the present respiration monitoring system employs a constant current impedance pneumograph and breath identification circuitry of the type described in the beforementioned U. S. Pat. application Ser. No. 656,805 it will be apparent to those skilled in the art that any one of the prior art instruments for providing electrical signals indicative of a recognized inspiration or expiration may be used to drive the present alarm control circuitry.

We claim:

1. In a physiological monitoring system wherein transducer means generates successive electrical signals indicative of the occurrence of a specific physiological activity, apparatus responsive to said electrical signals for indicating a multiplicity of physiological conditions comprising timing means responsive to the time interval between said successive electrical signals for generating a first output signal when said time interval exceeds a first predetermined interval;

first rate sensing means activated upon the occurrence of said first output signal and responsive to the rate of said electrical signals for generating a second output signal when said rate exceeds a first predetermined rate and for generating a third output signal when said rate is less than said first predetermined rate; and output means connected to said timing and rate sensing means and responsive to said first, second and third output signals for indicating the occurrence of selected physiological conditions.

2. The physiological monitoring system of claim 1 wherein said output means includes:

first output means responsive to said first and second output signals for indicating a first physiological condition upon the occurrence of said first output signal and for indicating the absence of said first physiological condition upon the occurrence of said second output signal.

3. The physiological monitoring system of claim 2 wherein said output means includes:

second output means responsive to said third output signal for indicating a second physiological condition upon the occurrence of said third output signal.

4. The physiological monitoring system of claim 3 further comprising:

second rate sensing means connected to said first rate sensing means and responsive to the rate of said electrical signals and activated upon the occurrence of said third output signal for generating a fourth output signal when said rate exceeds a second predetermined rate and for generating a fifth output signal when said rate is less than said second predetermined rate.

5. The physiological monitoring system of claim 4 wherein said second predetermined rate is greater than said first predetermined rate.

6. The physiological monitoring system of claim 4 wherein said second output means is disabled by said fourth output signal.

7. The physiological monitoring system of claim 6 further comprising:

third output means connected to said second rate sensing means, said third output means being enabled by said fifth output signal.

8. The physiological monitoring system of claim 7 wherein said first output means comprises a visual indicating device, said second output means comprises a pulsing audio tone generator, and said third output means comprises a solid audio tone generator.

9. The physiological monitoring system of claim 1 further comprising:

second rate sensing means connected to said first rate sensing means and activated by said third output signal and responsive to the rate of said electrical signals for generating a fourth output signal when said rate exceeds a second predetermined rate and for generating a fifth output signal when said rate is less than said second predetermined rate, said second predetermined rate being greater than said first predetermined rate.

10. The physiological monitoring system of claim 9 wherein said output means includes:

first, second and third output means, said first output means being connected to said timing means and enabled by said first output signal to indicate a first physiological condition, said second output means being connected to said first rate sensing means and enabled by said third output signal to indicate a second physiological condition, and said third output means being connected to said second rate sensing means and enabled by said fifth output signal to indicate a third physiological condition.

11. The physiological monitoring system of claim 10 wherein said first output means is disabled by said second output signal, and said second output means is disabled by said fourth output signal.

12. The physiological monitoring system of claim 11 wherein said first and second output means are automatically disabled by said second and fourth output signals, respectively, and further comprising:

manually operable means connected to said third output means for disabling said third output means.

13. The physiological monitoring system of claim 10 wherein said first, second and third output means comprise visual display devices.

14. The physiological monitoring system of claim 13 wherein said second output means further comprises a pulsing audio tone generator and wherein said third output means further comprises a solid audio tone generator.

15. The physiological monitoring system of claim 9 wherein said first rate sensing means comprises:

first bistable means having first and second stable states and first and second input terminals, said first bistable means being switched to said first stable state by a signal at said first input terminal and being switched to said second stable state by a signal at said second input terminal, said first output signal being applied to said first input terminal;

a first preset timer for timing a second predetermined time interval and for generating said third output signal at the end of said second time interval, said first timer being connected to said first bistable means and enabled when said first bistable means is switched to said first stable state, said timer being disabled when said first bistable means is switched to said second stable state; and first accumulator means responsive to the occurrence of said first output signal for counting the number of electrical signals occurring during said second time interval, said first accumulator means generating said second output signal when the number of counted signals occurring during said second timer interval exceeds a first predetermined number, said second output signal being applied to said second input terminal of said first bistable means to switch said bistable means to said second stable state thereby disabling said first timer.

16. The physiological monitoring system of claim 15 wherein said second rate sensing means comprises:

second bistable means having first and second stable states and first and second input terminals said second bistable means being switched to said first stable state by a signal at said first input terminal switched to said second stable state by a signal at said second input terminal, said third output signal being applied to said first input terminal of said second bistable means;

a second preset timer for timing a third predetermined time interval and for generating said fifth output signal at the end of said third time interval, said second timer being connected to said second bistable means and enabled when said second bistable means is switched to said first stable state, said second timer being disabled when said second bistable means is switched to said second stable state; and second accumulator means responsive to the occurrence of said first output signal for counting the number of electrical signals occurring during said second and third time intervals, said second accumulator means generating said fourth output signal when the number of counted signals occurring during said second and third time intervals exceeds a second predetermined number, said fourth output signal being applied to said second input terminal of said second bistable means to switch said second bistable means to said second stable state thereby disabling said second preset timer.

17. The physiological monitoring system of claim 16 wherein said second and third time intervals are equal.

18. The physiological monitoring system of claim 1 wherein said timing means comprises:

a preset timer, said preset timer being reset upon the occurrence of each electrical signal generated in response to the occurrence of the specific physiological activity, said preset timer generating said first output signal if the time interval before the next successive electrical signal exceeds said first predetermined interval.

19. The physiological monitoring system of claim 1 wherein said first rate sensing means comprises:
bistable means having first and second stable states and first and second input terminals, said bistable means being switched to said first stable state by a signal at said first input terminal and being switched to said second stable state by a signal at said second input terminal, said first output signal being applied to said first input terminal;
a preset timer for timing a second predetermined time interval and for generating said third output signal at the end of said second time interval, said timer being connected to said bistable means and being enabled when said bistable means is switched to said first stable state, said timer being disabled when said first bistable means is switched to said second stable state; and
accumulator means responsive to the occurrence of said first output signal for counting the number of electrical signals occurring during said second predetermined time interval, said accumulator means generating said second output signal when the number of counted signals occurring during said second predetermined time interval exceeds a first predetermined number, said second output signal being applied to said second input terminal of said bistable means to switch said bistable means to said second stable state and to disable said first timer.

20. In a respiration monitoring system comprising transducer means for monitoring physiological activity in a subject including respiration and producing a correspondingly varying electrical signal, and means for identifying signal components resulting from respiration and producing a characteristic output signal for each breath, the improvement comprising an alarm circuit responsive to said characteristic output signals for determining whether the breathing pattern of the subject is normal or abnormal, said alarm circuit comprising:
timing means responsive to said characteristic output signals for determining whether the timer period between successive breaths exceeds a first predetermined interval; and
first monitoring means activated by said timing means and responsive to said characteristic output signals and operative when said time period exceeds said first predetermined interval for determining the rate of said output signals during a second predetermined time interval.

21. In a respiration monitoring system according to claim 20, the improvement further comprising:
first output means connected to said timing means and said first monitoring means, said timing means enabling said first output means when the time period between successive output signals exceeds said first predetermined interval.

22. In a respiration monitoring system according to claim 21, the improvement further comprising:
second output means connected to said first monitoring means, said first monitoring means being operative to enable said second output means when said rate is less than a first predetermined rate during said second time interval, said first monitoring means being operative to disabled said first output means when said rate exceeds said first rate during said second time interval.

23. In a respiration monitoring system according to claim 22, the improvement further comprising:
second monitoring means activated by said timing means and responsive to said characteristic output signals and operative when said time period exceeds said first interval for determining the rate of said output signals during a third predetermined time interval, said third time interval running concurrently with but longer than said second time interval.

24. In a respiration monitoring system according to claim 23, the improvement further comprising:
means for connecting said second monitoring means to said second output means; and
third output means connected to said second monitoring means, said second monitoring means being operative to enable said third output means when said rate is less than a second predetermined rate during said third time interval, said second monitoring means being operative to disable said second output means when said rate exceeds said second rate during said second time interval.

25. In a respiration monitoring system according to claim 24, the improvement wherein said second predetermined rate is greater than said first predetermined rate.

26. In a respiration monitoring system according to claim 24, the improvement wherein said first output means comprises a visual indicating device, said second output means comprises a pulsing audio tone generator, and said third output means comprises a solid audio tone generator.

27. In a respiration monitoring system according to claim 24, the improvement wherein said first and second output means are automatically disabled by said first and second monitoring means, respectively, and further comprising:
manually operable means connected to said third output means for resetting said third output means.

28. A method for monitoring the breathing pattern of a subject and generating warning signals as a function of the extent of abnormality of said pattern comprising the steps of:
sensing the occurrence of each breath;
generating a first warning indication when no breath is sensed during a first time interval;
initiating a second time interval upon the generating of said first warning indication; and
generating a second warning indication when less than a first predetermined number of breaths are sensed during said second time interval.

29. A method according to claim 28 further comprising the steps of:
initiating a third time interval; and
generating a third warning indication when less than a second predetermined number of breaths are sensed during said third time interval.

30. A method according to claim 29 wherein said third time interval begins simultaneously with said second time interval and ends after said second time interval ends.

31. A method according to claim 30 wherein said second predetermined number of breaths is more than twice as great as said first predetermined number of breaths.

32. A method according to claim 29 wherein said third time interval immediately follows said second time interval.

33. A method according to claim 32 wherein said second predetermined number of breaths is greater than said first predetermined number of breaths.

PO-1050
(5/69)

UNITED STATES PATENT OFFICE
CERTIFICATE OF CORRECTION

Patent No. 3,584,618            Dated June 15, 1971

Inventor(s) Gordon R. Justus, Kenneth L. Kearns, Clyde J. Reinhard

It is certified that error appears in the above-identified patent and that said Letters Patent are hereby corrected as shown below:

Column 8, line 44 - after "terminal" insert --and being--.

Column 9, line 38 - change "timer" to read --time--.

Column 9, line 60 - change "disabled" to read --disable--.

Column 10, line 40 - change "generating" to read --generation--.

Signed and sealed this 4th day of January 1972.

(SEAL)
Attest:

EDWARD M. FLETCHER, JR.          ROBERT GOTTSCHALK
Attesting Officer                Acting Commissioner of Patents